(12) United States Patent
Esfandiari et al.

(10) Patent No.: US 6,748,065 B2
(45) Date of Patent: Jun. 8, 2004

(54) DISTRIBUTED AUTOMATIC ROUTE SELECTION USING RIP CACHING

(75) Inventors: Babak Esfandiari, Ottawa (CA); Thomas Gray, Carp (CA)

(73) Assignee: Mitel Corporation, Kanata (CA)

( * ) Notice: Subject to any disclaimer, the term of this patent is extended or adjusted under 35 U.S.C. 154(b) by 129 days.

(21) Appl. No.: 09/784,969

(22) Filed: Feb. 16, 2001

(65) Prior Publication Data

US 2001/0021247 A1 Sep. 13, 2001

(30) Foreign Application Priority Data

Feb. 17, 2000 (GB) .............................. 0003724

(51) Int. Cl.[7] .............................. H04M 15/00
(52) U.S. Cl. .............................. 379/114.02; 379/121.01; 379/221.02; 379/225
(58) Field of Search ............ 379/114.02, 114.12, 379/265.02, 225, 220.01, 221.01, 221.03, 221.07, 115.01, 114.01, 114.03, 114.28, 111, 112.01, 112.07, 114.05, 112.06, 114.06, 221.02, 112.02, 121.01, 114.1, 121.04, 121.05, 198; 705/37, 26, 10

(56) References Cited

U.S. PATENT DOCUMENTS 5,675,636 A  * 10/1997 Gray ..................... 379/114.15
5,802,502 A  * 9/1998 Gell et al. ................ 371/114.1
6,226,365 B1 * 5/2001 Mashinsky ............. 379/114.02
6,345,090 B1 * 2/2002 Walker et al. ......... 379/114.03

FOREIGN PATENT DOCUMENTS

GB    2289599    11/1995
GB    2344719    6/2000

OTHER PUBLICATIONS

Search Report of Great Britain Application No. GB 0003724.2.

* cited by examiner

Primary Examiner—Duc Nguyen
Assistant Examiner—Barry W Taylor
(74) Attorney, Agent, or Firm—F. Chau & Associates, LLC

(57) ABSTRACT

A RIP-based caching mechanism for bids in a distributed automatic route selection system for a network of PBXs. The PBXs are interconnected for propagating bid requests and replies therebetween. A cache table is maintained in each one of the PBXs for storing cached bid values for unused ones of the neighboring PBXs from whom replies have not been received responsive to a bid request. A subscribers table is also maintained in each PBX for identifying additional ones of the PBXs to whom bid value updates must be sent for updating their cache tables.

7 Claims, 2 Drawing Sheets

DISTRIBUTED AUTOMATIC ROUTE SELECTION USING RIP CACHING

FIELD OF THE INVENTION

This invention relates in general to distributed information systems, and more particularly to Automatic Route Selection (ARS) using RIP caching in a distributed communication system.

BACKGROUND OF THE INVENTION

Telecommunication systems have recently been designed for providing a variety of real-time services and features in an open distributed environment through the collaboration of a set of software components called agents. Such multi-agent systems are designed in such a way that they may adapt and evolve in the face of changing environments. One such multi-agent system is known as MANA (Multi-Agent Architecture for Networking Applications) developed by Mitel Corporation. Through the use of distributed agent architecture, the system meets high reliability levels and adapts to accommodate technological or service evolution. To achieve these goals, intelligence or learning mechanisms are provided to update service information derived from the operation of the agents. This information is used to redefine the agents and to reallocate resources for correcting failures and to meet the requirements of a defined service more precisely.

An application or service in a multi-agent system is mapped as a series of calls amongst agents to perform the service. Each agent specifies its type, quantity and quality of service (QoS) in order to provide for an overall application. Since multi-agent systems are implemented in an open environment, no agent has prior knowledge of any other agent. The only knowledge that an agent possesses is its requirements and capabilities to provide a specific type of service. Thus, an agent may be required to find other agents to fulfill certain of its service requirements. A calling agent (referred to herein as a Bid Manager) sends out a bid for services to a plurality of called agents (referred to herein as Bidders), each of whom may be capable of providing the necessary resources for the Bid Manager to complete its task. The Bid Manager receives and evaluates the bids from the various Bidders and selects the agent which has the best chance of success in performing the requested service. This is referred to herein as selecting the "lowest bid".

One example of a classic bidding mechanism of the foregoing type is disclosed in commonly owned U.S. Pat. No. 5,675,636 entitled Adaptive Method of Allocating Calls. According to this system, a Router Agent sends a call for bids to a plurality of Carrier Agents in order to determine the cost to complete a call by each of the Carrier Agents. The system then selects the cheapest bid. In the embodiment disclosed in U.S. Pat. No. 5,675,636 all of the Bidders are running in the same PBX as the BidManager. However, in the case of a distributed telecommunications system, some of the bidding Carrier Agents may be running on one or more remote PBX's that are linked with the local PBX through a leased line, as set forth in co-pending and commonly owned patent application Ser. No. 09/455,658 filed Dec. 7, 1999 and entitled Distributed Technique for Allocating Calls. In such a system it is important to optimize the bidding process to avoid having to request bids from each Bidder each time a service is requested. Requesting bids can be time-costly and therefore tend to be inapplicable in real-time applications such as Advanced Automatic Route Selection (AARS) as set forth in U.S. Patent 5,675,636. Optimizations to ease the burdens of giving and receiving bids can lower material and operational costs of systems especially in the case of distributed systems.

SUMMARY OF THE INVENTION

According to the present invention, the well-known RIP routing algorithm is applied to a caching mechanism for optimizing the bidding process in an AARS system. The RIP algorithm used in the Internet to route data (ref RFC 1058), requires each router to send to its neighbors a copy of its routing table with the distance (number of hops) that separates it from the different nodes of the network. However, the problem addressed by the present invention is not minimization of the number of hops between the nodes, but rather the cost between the terminal node of the path and the local carrier it uses to get to the actual destination. The inventors have realized that it is not realistic to hold all of the destinations in the world in a single table. This is especially true if the network is not owned or managed by a single entity. Therefore, the routing table generated by the system of the present invention consists of a finite number of nodes in the network of PBXs, and the most frequently used terminal destinations of the calls of the users of the PBX system. These destinations are then cached using the caching mechanism set forth in commonly owned patent application Ser. No. 09/768,129 filed Jan. 23, 2001 entitled Caching Mechanism to Optimize a Bidding Process Used to Select Resources and Services. Specifically, a caching mechanism is provided for storing the latest bids by one or more Bidders for a given bidding context.

BRIEF DESCRIPTION OF THE DRAWINGS

A detailed description of the prior art and of the preferred embodiment of the present invention is provided herein below, with reference to the drawings in which.

DETAILED DESCRIPTION OF THE PREFERRED EMBODIMENT

Figure 1:
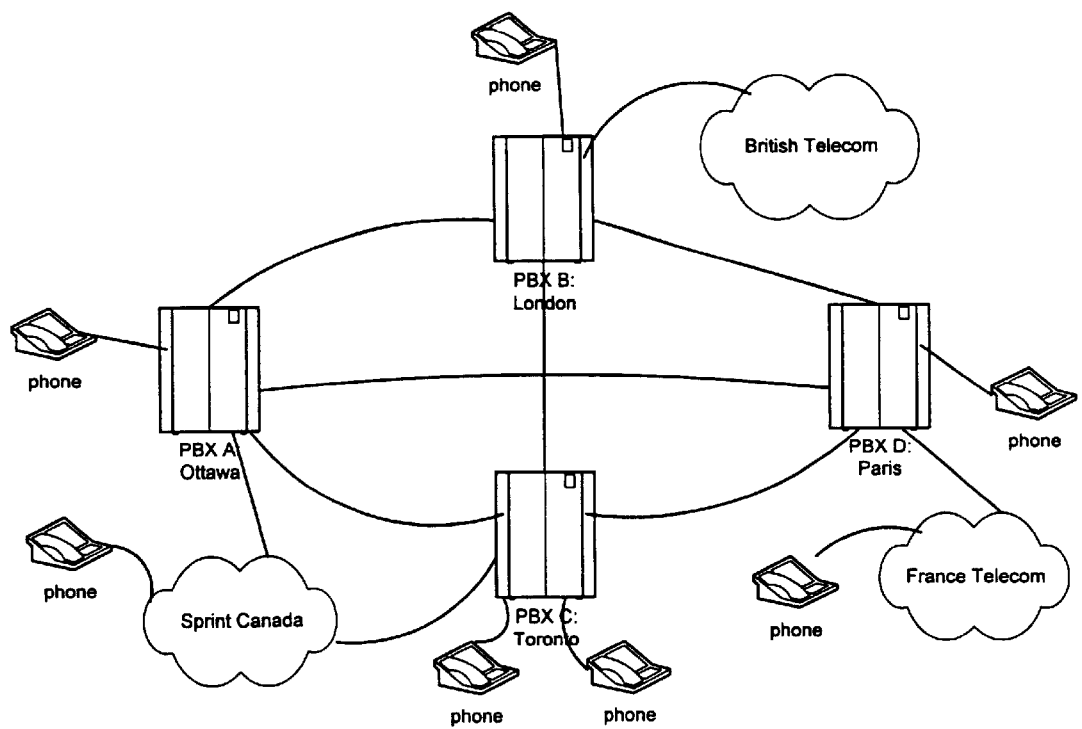
FIG. 1 is a schematic representation of a network of PBXs for implementing a distributed AARS system according to an embodiment of the present invention.
Figure 2:
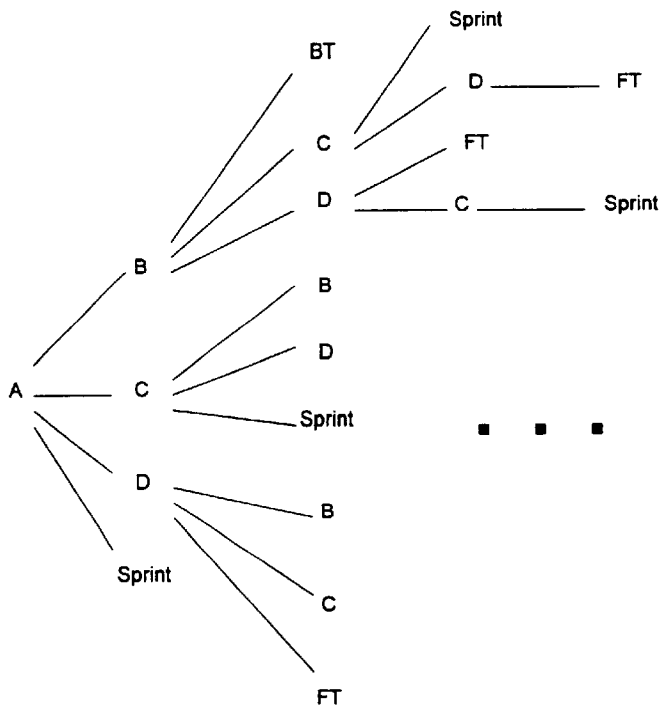
FIG. 2 shows a cost tree for different routing options using the network of FIG. 1.

Turning to FIG. 1, a network of PBXs (PBXs A, B, C and D) is shown with tandeming connections therebetween and trunks from each PBX to a local carrier (e.g. PBXs A and C are connected to Spring Canada, PBX B is connected to British Telecom and PBX D is connected to France Telecom). Using the ARS methodology set forth in U.S. Pat. No. 5,675,636, as extended by co-pending application Ser. No. 09/455,658, a route selection request for a call from Ottawa to Lyon, France results in a request for bids being sent by the Bid Manager agent in Ottawa to PBXs B, C and D and to local long distance carrier Sprint Canada. PBXs B, C and D then propagate bid requests to each of the PBXs and carriers connected respectively thereto (with the exception of PBXs and carriers in the tree branch which have already processed the bid request (the path of the bid request is added to each request message as set forth in application Ser. No. 09/455,658 to prevent forwarding the message to the same node twice)). The cost tree for this specific example is shown in FIG. 2, wherein A represents PBX A, B represents PBX B, etc. In total, 4+9+12+6=31 request messages and 31 reply messages are generated, with the result that PBX A must wait before deciding on a call routing path for a time period equivalent to the time required to propagate the request and reply messages across the slowest connection of nodes spanning the depth of the tree (i.e. in this example at least 2×4=8 branch lengths).

As set forth in co-pending patent application Ser. No. 09/768,129, caching of bids may be used to decrease the length of time required to process the bid request. However, in order to further reduce the processing time and ensure that the agent requesting the bid does not wait for answers from all of the nodes, a list of pending unused neighbors is stored for each node (i.e. PBX) representing the available neighbor PBXs from whom answers have not been received or which have been added recently to the network. Thus, the neighboring nodes which do not appear in a particular routing list or cache table represent the nodes along the tree branch which have already provided answers to the bid request. Thus, for example, the cache table in PBX A may appear as follows:

| Destination | Cost | Via node | Unused nodes |
|---|---|---|---|
| Lyon | 56 | D | B, C |
| Toronto | 5 | Sprint | D |

In this table, only the most frequently used terminal destinations are provided as entries to the cache. In actual cache tables, the entry could have additional parameters such as Time of Day, Day of Week, Type of Call (voice/data). Also, the Cost need not only represent the billing plans and the costs of the tandeming connections between PBXs, but can also incorporate values such as the network bandwidth, or the overall Quality of Service as monitored periodically by the PBXs (cf. Co-pending application No. Ser. 09/435,857 filed Nov. 8, 1999 and entitled Mechanism for Discounting in a Bidding Process Based on a Quality of Service.

Since there is no way of detecting failure of a node using pure caching, the mechanism of the present invention also triggers periodic updates of the cache. As described in co-pending patent application Ser. No. 09/768,129, a further list or table is stored of subscribers for given destinations that are maintained by the PBXs in order to forward updates to any value of the cache. Thus, the subscribers table in PBX B could appear as follows:

| Destination | Subscribed nodes |
|---|---|
| Lyon | A, C |
| Ottawa | A |

Use and population of the caching table and subscribers table will be understood with reference to the message types and algorithms set forth below.

In order to simplify the behavior of the ARS system according to the present invention, only two different types of messages are implemented: request and update. Although a specific message can be defined in reply to a request, the behavior of the system has been simplified so that its reaction is the same as when receiving an update message. This way, the waiting time and time-outs necessary after the sending of a request message are avoided. This asynchronicity allows a faster response time, but slows down the convergence of the system to the best price, as set forth below.

Figure 3:
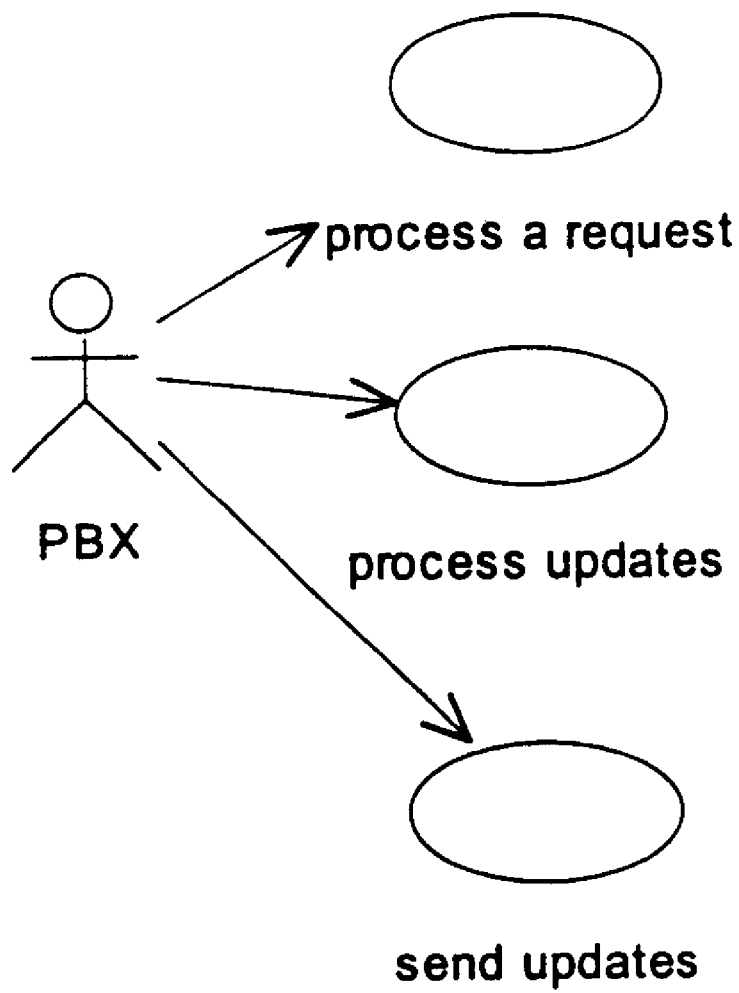
FIG. 3 is use case diagram showing Actors and Use Cases for implementing the RIP caching mechanism according to an embodiment of the present invention.

With reference to FIG. 3, the PBX actor is an Enterprise Viewpoint representation of any one of the PBXs in the network.

The process request use case starts when a PBX receives a bid request message either from a line or from another PBX. The PBX then replies with a cost value from its cache table (if a value has been stored). The PBX then appends its name to the list of forbidden nodes, to avoid looping, and forwards the request to all other PBXs on the network from whom it has not already received a cost reply value (i.e. to the Unused Nodes in its cache table). The PBX then optionally updates its list of subscribers.

The process updates use case starts when the PBX receives an update message from a Carrier agent or another PBX. The PBX first optionally updates the list of unused nodes in its cache table for the given entry. If the received updated cost value is better than the value existing in the cache table, the PBX updates its cache table with the new value, forwards the value to its list of subscribers and updates the list of unused nodes in its cache table.

The send updates use case is triggered periodically by the PBX to update its subscribers with new values from the tables, or information about the network load.

There are three fields for the request message: Sender, Destination and Forbidden Nodes. The Sender field is used by the node for additions to the subscription list. The Destination field is used in the subscription list and the cache table, as well as to forward the same message as a request message to unused nodes. Optionally, other parameters such as Time of Day, Type of Call . . . can be added. The Forbidden Nodes field is used to limit forwarding of the message to the nodes that have not received the message previously, to avoid looping.

The fields for the update message are: Sender, Destination and Cost. The Sender field is used by the node for updating the cache table. The Destination and Cost fields are used to update the cache table, if the cost is better than the one already stored in the cache for the given entry corresponding to the Destination.

The algorithm for implementing the request message may be expressed in pseudo-Pascal form, as follows:

procedure Request(sender: Sender, dest: Destination, {forbidden})
  1—if (sender, dest)∉Subscribers(dest) then Subscribers(dest)+=(sender, dest);
  2—if Cache.cost(dest) ≠∅ then sendTo(sender, (update: (me, dest, cost)));
  3—sendTo(({Cache.unused(dest)}−{forbidden}), request:(me, dest, {forbidden}+me ) ).

The first line of code adds the sender to the list of subscribers if it doesn't already belong to it for the given cache entry. The second line sends a reply to the sender with the current value of the cache. Since the reply is sent before receiving all replies from other nodes, the path chosen by the ARS often is not optimal in the beginning, but soon converges to the optimum when all of the replies have been received, and the updates have been sent. Proof of convergence of the algorithm is provided herein below. The third line broadcasts the request message to all of the neighbors that are not in the forbidden list.

procedure Update(node: Sender, dest: Destination, cost)
  1—if node ∈ Cache.unused(dest) then Cache.unused(dest} −=node;
  2—if cost <Cache.cost(dest) then
    begin
      Cache.via(dest):=node;
      Cache.cost(dest):=cost;
    end;
  3—sendTo({Subscribers(dest)}, update:(me, dest, cost+cost(me, subscriber)) ).

The first line of code removes the sender of the message from the list of unused nodes for that given entry of the cache. The second line updates the cache table if the received update is better than the current value of the cache for that given entry. If the sender happens to be the one stored in the cache and the new value is worse, then it is possible to send requests to the other nodes in an effort to find a better value. However, it is also possible simply to wait for the periodic updates. Finally, the third line forwards the update to the subscribers to that entry after adding the cost to reach the given subscribers.

As indicated briefly above, the temporary replies from intermediate nodes are not always optimal, which could lead a person of ordinary skill in the art to question whether the algorithm will actually converge to an optimal cost value without traversing the entire tree of requests before replying. The following is a proof of convergence of the algorithm according to the present invention:

Definition a node is said to have an n-range access if it can obtain the optimum cost corresponding to a distance (number of hops)=n in the complete request tree.

Now to prove the convergence, it must be proven that any node of the network of PBXs has an n-range access, $\forall n=1$ ... number of nodes.

Lemma 1: $\forall$ node n, n has a 1-range access.

Proof: by construction of the request and update procedures, it is assured that each node receives a reply to its requests to the immediate neighbors. In particular, each node knows about the cost of the link to its neighbors. This reflects the assumption that each node has at least one neighbor.

Lemma 2: $\forall$ node n, $\forall$ m, if n has a 1-range access, then n has an m-range access.

Proof: by induction on m, it may be proven that if n has a p-range access, then n has a p+1-range access:

p=0: obvious (lemma 1)

now if it is assumed that all nodes have a p-range access, then all of their common direct ancestors in the tree have a p+1 range access, since there is also a 1-range access to all of the nodes, by definition of an n-range ancestors. Even if the graph is not a clique (a "clique" is a strongly connected graph where every node in the graph is connected to every other node in the graph), since the tree includes all of the nodes of the network, then they are all ancestors of someone. Therefore they all have a p+1-range access.

Theorem: $\forall$ node n, $\forall$ m, n has an m-range access.

Proof: obvious using Lemmas 1 and 2.

It will be appreciated that, although a particular embodiment of the invention has been described and illustrated in detail, various changes and modifications may be made. All such changes and modifications may be made without departing from the sphere and scope of the invention as defined by the claims appended hereto.

What is claimed is:

1. In a distributed automatic routing selection system for a network of PBXs, said PBXs being interconnected for propagating bid requests and replies therebetween, the improvement comprising maintaining in each one of said PBXs a cache table for storing cached bid values for unused ones of said PBXs from whom replies have not been received responsive to said bid requests, and a subscribers table for identifying additional ones of said PBXs to which each said one of said PBXs subscribes updates to said cache table.

2. The improvement of claim 1, wherein said cache table and said subscribers table are maintained via exchange of request and update messages between said PBXs.

3. The improvement of claim 2, wherein said request message is sent by each said one of said PBXs in response to receiving one of said bid requests, for replying with a cost value from its cache table, appending its name to a list of forbidden nodes, and forwarding the bid request to said unused ones of said PBXs.

4. The improvement of claim 3, wherein said update message is sent by each said one of said PBXs responsive to receipt of an update message from another one of said other PBXs, for updating its list of unused PBXs, and if the received update message contains a new bid value for said another one of said PBXs, which is better than its cached bid value in the cache table, said one of said PBXs updates its cache table with the new bid value, and forwards said new bid value to said additional ones of said PBXs.

5. The improvement of claim 4, wherein said request message is implemented by an algorithm comprising the steps of:

i) adding said another one of said PBXs to said list of unused PBXs if said another one of said PBXs is not already on said list of unused PBXs;

ii) sending said cost value to said another one of said PBXs; and iii) broadcasting the request message to all other ones of said PBXs not one of the neighbors that are not in said list of forbidden nodes.

6. The improvement of claim 5, wherein said update message is implemented by an algorithm comprising the steps of:

i) removing said another one of said PBXs from the list of unused PBXs;

ii) updating said cache table with said new bid value; and iii) broadcasting the update message to said additional ones of said PBXs.

7. A PBX storing a cache table for storing cached bid values for unused PBXs in a network from whom replies have not been received responsive to bid requests, and a subscribers table for identifying additional PBXs to which bid value updates are sent for updating cache tables therein.

* * * * *